United States Patent [19]
Bowman

[11] Patent Number: 5,422,086
[45] Date of Patent: Jun. 6, 1995

[54] PROCESS OF REMOVING HYDROGEN SULFIDE FROM A GAS MIXTURE

[75] Inventor: David F. Bowman, The Hague, Netherlands

[73] Assignee: Shell Oil Company, Houston, Tex.

[21] Appl. No.: 97,803

[22] Filed: Jul. 27, 1993

[30] Foreign Application Priority Data

Jul. 27, 1992 [EP] European Pat. Off. ............ 92202316

[51] Int. Cl.$^6$ .............................................. C01B 17/16
[52] U.S. Cl. .................................. 423/220; 423/224; 423/226; 423/576.5; 423/576.6
[58] Field of Search ............ 423/220, 223, 226, 576.6, 423/576.5, 224

[56] References Cited

U.S. PATENT DOCUMENTS

| | | | |
|---|---|---|---|
| 3,725,529 | 4/1973 | Giammarco et al. | 423/223 |
| 3,728,440 | 4/1973 | Hamblin | 423/573 |
| 3,962,404 | 6/1976 | Giammarco et al. | 423/222 |
| 4,372,925 | 2/1983 | Cornelisse | 423/226 |
| 4,526,773 | 7/1985 | Weber | 423/573 R |
| 4,534,955 | 8/1985 | Rosenbaum | 423/574 R |
| 4,853,192 | 8/1989 | Fong | 423/226 |
| 4,871,520 | 10/1989 | Olson et al. | 423/221 |
| 5,139,753 | 8/1992 | Hardison | 423/220 |

FOREIGN PATENT DOCUMENTS

| | | | |
|---|---|---|---|
| 0186235 | 7/1986 | European Pat. Off. | |
| 0215505 | 3/1987 | European Pat. Off. | |
| 0244249 | 11/1987 | European Pat. Off. | 423/576.6 |
| 4737895 | 4/1974 | Japan | 423/220 |

OTHER PUBLICATIONS

Search Report dated Oct. 28, 1993 attached.

*Primary Examiner*—Ferris Lander
*Assistant Examiner*—Timothy C. Vanoy

[57] ABSTRACT

The present invention relates to a process for removing hydrogen sulfide from a hydrogen sulfide containing gas comprising contacting the gas in a contactor with an aqueous reactant solution including a coordination complex of Fe(III) with a chelating agent to produce a purified gas and spent aqueous reactant solution containing solid sulfur and having an increased content of coordination complex of Fe(II) with the chelating agent, and regenerating the spent aqueous reactant solution by contacting in a first contact vessel the spent aqueous reactant solution co-currently with air to produce partly regenerated aqueous reactant solution followed by contacting in a second contact vessel partly regenerated aqueous reactant solution counter-currently with air to produce regenerated aqueous reactant solution which is removed from the lower part of the second contact vessel.

2 Claims, 1 Drawing Sheet

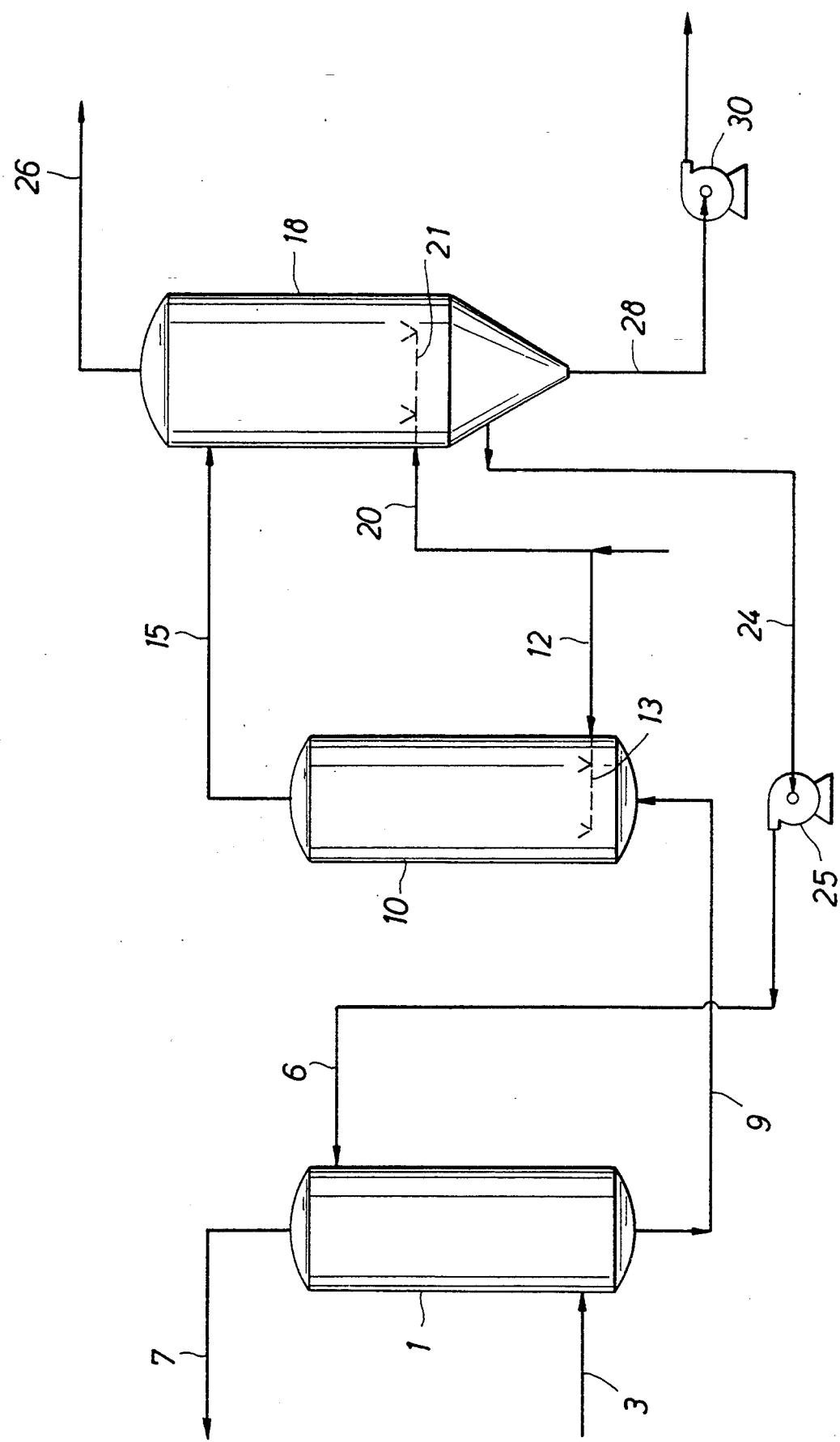

PROCESS OF REMOVING HYDROGEN SULFIDE FROM A GAS MIXTURE

FIELD OF THE INVENTION

The present invention relates to a process of removing hydrogen sulfide from a hydrogen sulfide-containing gas mixture by contacting the gas mixture in a contactor at a temperature below the melting point of sulfur with an aqueous reactant solution comprising a coordination complex of Fe(III) with a chelating agent to produce a purified gas stream having a reduced hydrogen sulfide content and a spent aqueous reactant solution containing solid sulfur and having an increased content of coordination complex of Fe(II) with the chelating agent, and regenerating the spent aqueous reactant solution to obtain regenerated aqueous reactant solution.

DESCRIPTION OF THE PRIOR ART

U.S. Pat. No. 4,871,520 discloses a method for removing hydrogen sulfide from a gas mixture. In the contacting stage of this method, hydrogen sulfide is oxidized to elemental sulfur by Fe(III) which in turn is reduced to Fe(II). The oxidation is believed to take place according to the following reaction:

$$2\ Fe(III)(L) + H_2S \rightarrow 2\ Fe(II)(L) + S + 2H^+$$

The spent aqueous reactant solution is regenerated for further use by contacting the solution with a free oxygen containing gas so that Fe(II) is oxidized to Fe(III) to produce a regenerated aqueous reactant solution which can be used in the contacting stage. The regeneration is believed to take place according to the following reactions:

$$2\ Fe(II)(L) + O_2 + 2H^+ \rightarrow 2\ Fe(III)(L) + H_2O_2$$

$$Fe(II)(L) + H_2O_2 \rightarrow Fe(III)(L) + .OH + OH^-$$

$$Fe(II)(L) + .OH \rightarrow Fe(III)(L) + OH^-$$

As the reaction proceeds, the chelating agent (L) is degraded. The degradation of the chelating agent (L) is believed to take place according to the following reaction:

$$L + .OH \rightarrow degradation\ products$$

In the above reaction equations .OH is a free hydroxyl radical, Fe(III)(L) is the coordination complex of Fe(III) with a chelating agent L, and Fe(II)(L) is the coordination complex of Fe(II) with a chelating agent L.

In European Patent Application Publication No. 215 505 it is proposed to maintain a certain concentration of Fe(II) in the regenerated aqueous reactant solution, larger than about 0.15 mol Fe(II) per mol Fe in order to reduce degradation of the chelating agent, suitably the amount is larger than about 0.15 mol Fe(II) per mol Fe.

European Patent Specification No. 186 235 discloses the regeneration of a spent aqueous solution wherein the solution and free oxygen containing gas are forced to flow in plug flow co-currently through a contact vessel, so that in the direction of flow through the contact vessel the concentration of .OH simultaneously decreases with the concentration of Fe(II) which is oxidized to Fe(III).

It appears in practice that even when attempting to operate in plug flow some backmixing will occur so that the contact vessel approximates an ideal mixer wherein the composition of the fluid in the contact vessel is substantially equal to the composition of the fluid leaving the vessel. Degradation of the chelating agent can then only be avoided if the conversion to Fe(III) is not complete.

To reduce backmixing the contact vessel can be provided with packing. Alternatively, a long, slender contact vessel can be used. These solutions are undesirable since the packing is susceptible to fouling and the use of packing will give rise to a large pressure drop. The use of a long, slender contact vessel will also give rise to a large pressure drop.

It is an object of the present invention to provide a process wherein during regeneration, degradation of the chelating agent is reduced, and wherein the Fe(II) concentration in the regenerated reactant solution is less than 0.10 mol Fe(II) per mol Fe, which corresponds to more than 0.90 mol Fe(III) per mol Fe.

SUMMARY OF THE INVENTION

The present invention relates to a process of removing hydrogen sulfide from a hydrogen sulfide-containing gas mixture by contacting the hydrogen sulfide-containing gas mixture with an aqueous reactant solution comprising a coordination complex of Fe(III) with a chelating agent in a contactor at a temperature below the melting point of sulfur to produce a purified gas stream having a reduced hydrogen sulfide content and a spent aqueous reactant solution stream containing solid sulfur and having an increased content of coordination complex of Fe(II) with the chelating agent, and regenerating the spent aqueous reactant solution.

BRIEF DESCRIPTION OF THE FIGURE

The sole FIGURE consists of a schematic view of the equipment utilized for carrying out the present invention.

DESCRIPTION OF THE PREFERRED EMBODIMENTS

The present process comprises removing hydrogen sulfide from a hydrogen sulfide-containing gas mixture by contacting the gas mixture in a contactor at a temperature below the melting point of sulfur (i.e., less than about 120° C.) with an aqueous reactant solution having a coordination complex of Fe(III) with a chelating agent to produce a purified gas stream having a reduced hydrogen sulfide content and a spent aqueous reactant solution and then regenerating the spent aqueous reactant solution. The spent aqueous reactant solution contains solid sulfur and has an increased content of coordination complex of Fe(II) with the chelating agent. The spent aqueous reactant solution is regenerated to produce regenerated aqueous reactant solution by contacting in a first contact vessel the spent aqueous reactant solution co-currently with free oxygen containing gas to produce partly regenerated aqueous reactant solution and contacting in a second contact vessel partly regenerated aqueous reactant solution counter-currently with free oxygen containing gas to produce regenerated aqueous reactant solution which is removed from the lower part of the second contact vessel.

The invention will now be described in more detail by way of example with reference to the accompanying figure. A hydrogen sulfide containing gas mixture is supplied to a contactor 1 through feed conduit 3. In contactor 1 the gas mixture is contacted at a temperature below the melting point of sulfur with an aqueous reactant solution including a coordination complex of Fe(III) with a chelating agent which is supplied to contactor 1 through conduit 6. In the contactor 1 hydrogen sulfide is oxidized to elemental sulfur by Fe(III) which in turn is reduced to Fe(II). A purified gas stream having a reduced hydrogen sulfide content is removed from contactor 1 through conduit 7 and spent aqueous reactant solution containing solid sulfur and having an increased content of coordination complex of Fe(II) with the chelating agent is removed through conduit 9.

The hydrogen sulfide containing gas mixture can be any gas mixture containing hydrogen sulfide, including, but not limited to, natural gas and synthesis gas produced from the partial combustion of coal, hydrocarbon oil or natural gas. The concentration of hydrogen sulfide can be in the range of from about 0.05% to about 50% by volume.

The aqueous reactant solution contains in the range of from about 2 mol to about 15 mol of Fe(III) per mol of hydrogen sulfide to be removed. The chelating agent is suitably an organic acid, for example nitrilotriacetic acid, ethylenediaminetetraacetic acid or hydroxyethylethylenediaminetriacetic acid. The pH of the reactant solution is suitably in the range of from about 4.0 to about 8.0. Preferably, the temperature in the contactor 1 ranges from about 10° C. to about 80° C., the pressure from about 0.1 MPa to about 15 MPa and the contact time ranges from about 1 second to about 120 seconds.

In order to regenerate spent aqueous reactant solution, the solution is supplied to a first contact vessel 10. In the first contact vessel spent aqueous reactant solution is contacted co-currently with free oxygen containing gas in the form of air supplied to the vessel 10 through conduit 12 and distributor 13 arranged in the first contact vessel 10. In the first contact vessel 10 the spent aqueous reactant solution is only partly regenerated, and a mixture of spent air and partly regenerated aqueous reactant solution is supplied through conduit 15 to a second contact vessel 18.

In the second contact vessel 18 partly regenerated aqueous reactant solution is counter-currently contacted with free oxygen containing gas in the form of air supplied through conduit 20 and distributor 21 arranged in vessel 18. The regeneration of the aqueous reactant solution is completed in the second contact vessel 18, and regenerated aqueous reactant solution which is removed from the lower part of the second contact vessel 18 through conduit 24. The regenerated aqueous solution is pumped by pump 25 to the contactor 1 for re-use.

Spent air from both contact vessels 10 and 18 is removed from the second contact vessel 18 through conduit 26 and a stream which is rich in elemental sulfur is removed through conduit 28 provided with pump 30.

The amount of Fe(II) which is oxidized in the regeneration depends on the contact time and on the amount of free oxygen containing gas wherein the amount of oxygen can be selected to be direct proportional to the amount of hydrogen sulfide in the gas mixture to be treated.

The method of regenerating spent aqueous reactant solution in the process of the present invention facilitates selecting the contact times in the first and second contact vessels, 10 and 18, so that in the first contact vessel 10 the concentration of Fe(II) in the stream leaving the first contact vessel 10 through conduit 15 is between 0.20 mol and 0.50 mol Fe(II) per mol Fe and the concentration of Fe(II) in the stream leaving the second contact vessel 18 is below 0.10 mol Fe(II) per mol Fe. In practice the minimum concentration of Fe(II) in the stream leaving the second contact vessel 18 is about 0.01 mol Fe(II) per mol Fe.

The regeneration is suitably performed at atmospheric pressure and ambient temperature with air which contains 21% by volume of oxygen. The contact time in the first contact vessel 10 is between 8 minutes and 12 minutes and in the second regeneration vessel 18 the contact time is between 6 minutes and 10 minutes. When required, regeneration can be done at higher pressures and temperatures.

The advantage of the regeneration process in the process of the present invention can be explained as follows. We assume that the concentration of Fe(III) formed from Fe(II) is directly proportional to contact time, which assumption implies that it takes about the same contact time to reduce the concentration of Fe(II) to 0.10 mol Fe(II) per mol Fe in one contact vessel or in two contact vessels, and assume that the amount of degradation of the chelating agent is directly proportional to contact time as well and that the amount of degradation is inversely proportional to the concentration of Fe(II). In addition, we assume that a contact vessel can be considered as an ideal mixer, so that the concentrations of the compounds in the contact vessel equal the concentrations of the compounds leaving the contact vessel.

Let us take as an example regenerating a spent aqueous reactant solution containing about 0.80 mol Fe(II) per mol of Fe, which is so regenerated that the final concentration of Fe(II) is 0.10 mol per mol Fe, to obtain this final Fe(II)-concentration the total regeneration time is 18 minutes.

In the case that one contact vessel is employed the final concentration of Fe(II) is obtained in this contact vessel. In the case that two contact vessels are employed, this final concentration is reached in two stages: a first stage wherein the concentration of Fe(II) is 0.40 mol per mol Fe (contact time 10 minutes) and a second stage wherein the final concentration is 0.10 mol per mol Fe (contact time 8 minutes). Thus in case one contact vessel is employed there is about 0.10 mol Fe(II) per mol Fe present in the contact vessel for the 18 minutes it takes to oxidize Fe(II), whereas in the case that two contact vessels are employed, in the first contact vessel there is about 0.40 mol Fe(II) per mol Fe during 10 minutes, and only during 8 minutes in the second contact vessel the concentration of Fe(II) is 0.10 mol per mol Fe, Thus the amount of degradation of the chelating agent in the first contact vessel is much smaller than the amount of degradation in the second contact vessel, and the total amount of degradation is much smaller than the amount of degradation in case only one contact vessel had been used.

In the line-up as described with reference to the figure, the gas mixture and aqueous reactant solution are contacted counter-currently in contactor 1. Other gas-liquid contactors can be used as well. Examples are a spray column or a co-current contactor or any combination of the contactors.

The ranges and limitations provided in the instant specification and claims are those which are believed to particularly point out and distinctly claim the invention. It is, however, understood that other ranges and limitations that perform substantially the same function, in substantially the same way to obtain the same or substantially the same result are intended to be within the scope of the instant invention as defined by the instant specification and claims.

What is claimed is:

1. A process for removing hydrogen sulfide from a hydrogen sulfide containing gas mixture which process comprises contacting the gas mixture in a contactor at a temperature below the melting point of sulfur with an aqueous reactant solution including a coordination complex of Fe(III) with a chelating agent to produce a purified gas stream having a reduced hydrogen sulfide content and a spent aqueous reactant solution containing solid sulfur and having an increased content of a coordination complex of Fe(II) with the chelating agent, and regenerating the spent aqueous reactant solution to obtain a regenerated aqueous reactant solution by contacting in a first contact vessel the spent aqueous reactant solution co-currently with a free oxygen containing gas to produce a partly regenerated aqueous reactant solution and contacting in a second contact vessel the partly regenerated aqueous reactant solution counter-currently with a free oxygen containing gas to produce regenerated aqueous reactant solution which is removed from the lower part of the second contact vessel.

2. The process of claim 1 which further comprises removing a sulfur-rich stream from the lower part of the second contact vessel below the location from which regenerated aqueous reactant solution is removed.

* * * * *